April 5, 1932. W. W. KEMP 1,852,526
METHOD OF AND APPARATUS FOR HEATING OVENS
Filed April 25, 1928 3 Sheets-Sheet 3
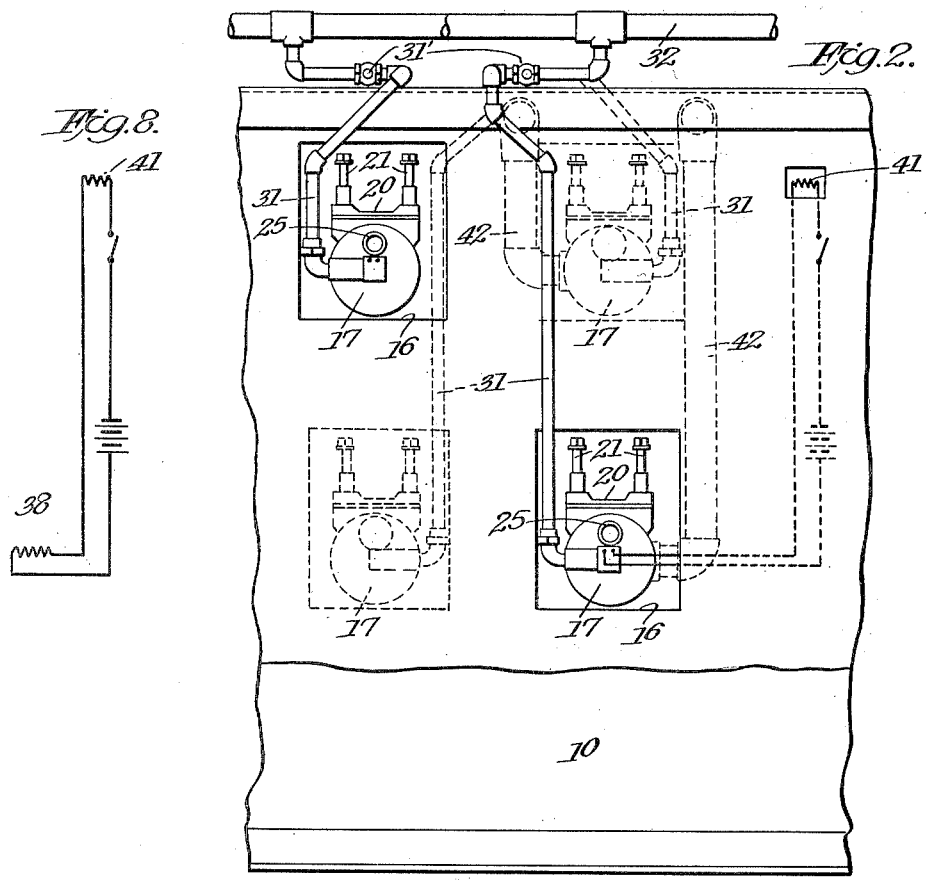
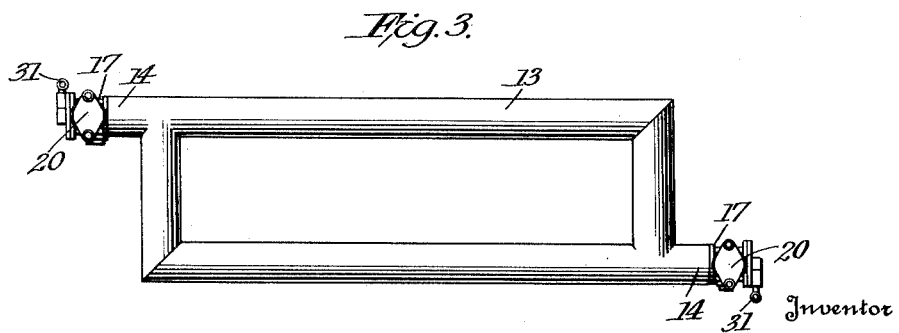

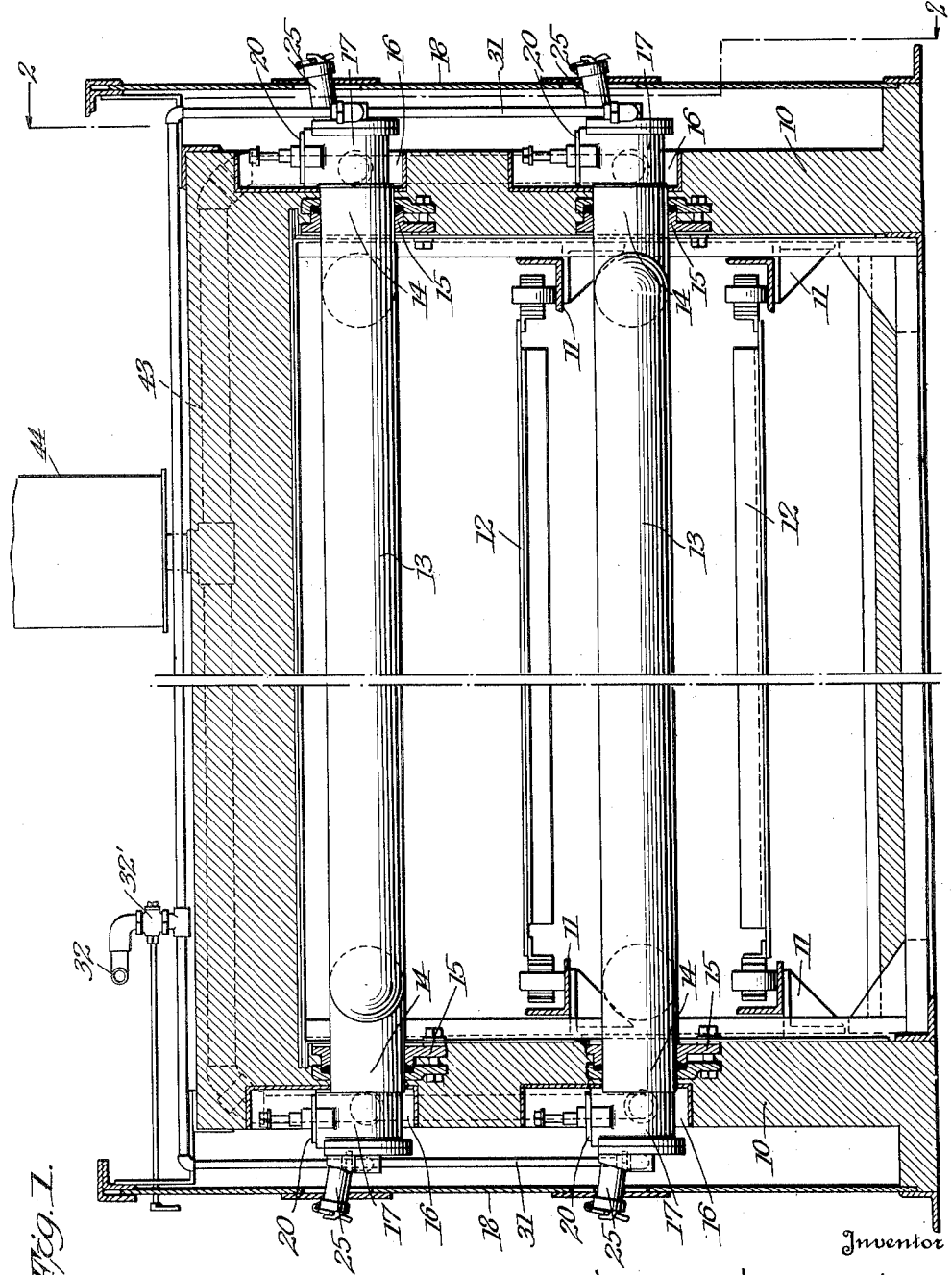

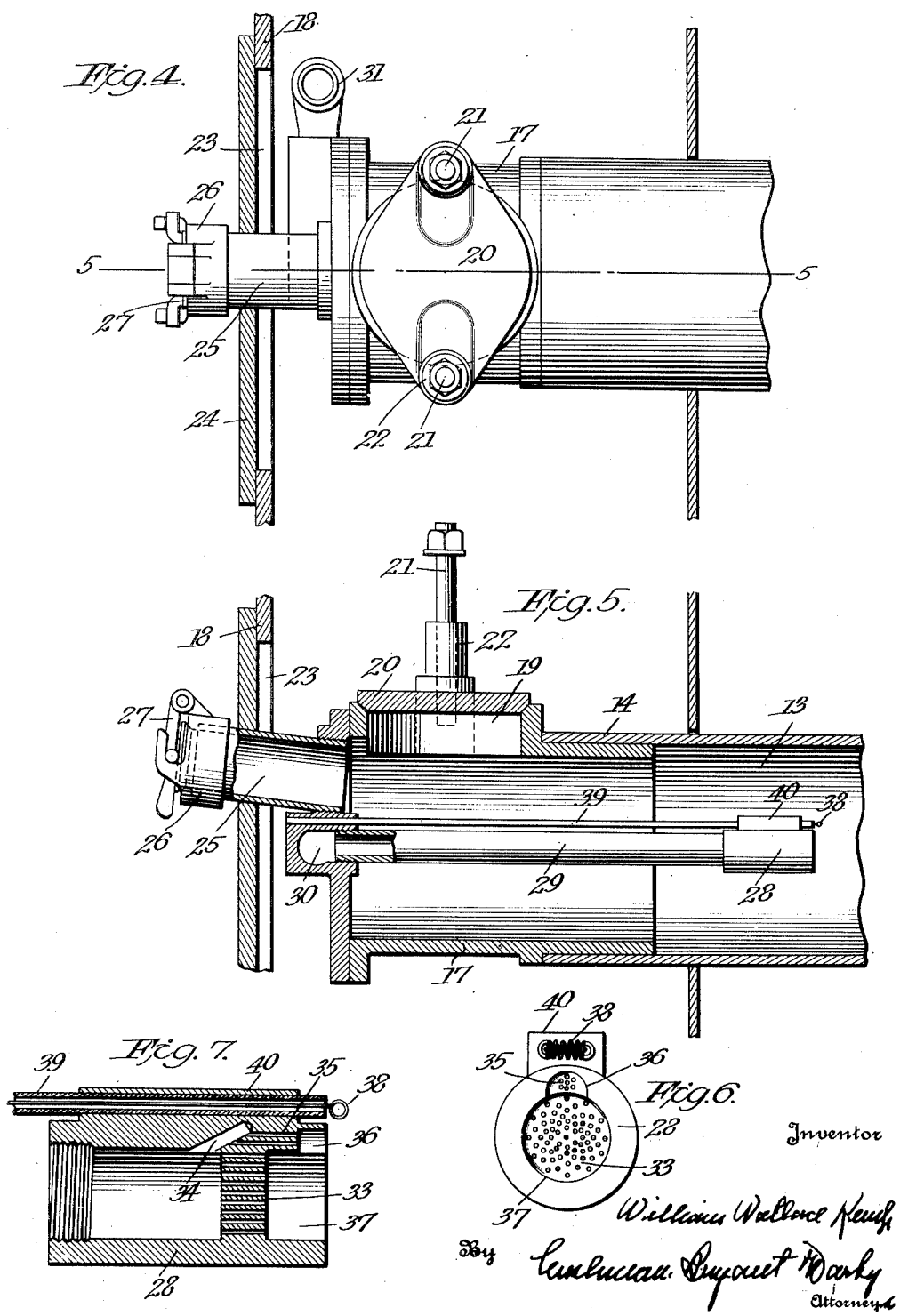

Patented Apr. 5, 1932

1,852,526

UNITED STATES PATENT OFFICE

WILLIAM WALLACE KEMP, OF BALTIMORE, MARYLAND, ASSIGNOR TO THE C. M. KEMP MANUFACTURING COMPANY, INC., OF BALTIMORE, MARYLAND, A CORPORATION OF MARYLAND

METHOD OF AND APPARATUS FOR HEATING OVENS

Application filed April 25, 1928. Serial No. 272,835.

The present invention relates to ovens, and particularly to a method and devices for heating and controlling the heat of ovens.

As disclosed in the present case, the invention is illustrated and described in connection with a baker's oven, as one example of its use, but it will be understood that this is merely illustrative, and in no sense restrictive, as the method, and the devices, may be used in any oven where heat application and control is desirable.

In its broad aspect, the invention contemplates the use of one or more heat distributing elements or radiators, so disposed in the oven structure as to give rapid, efficient, and uniform heating of the oven chamber, and this is accomplished with a minimum consumption of the heating medium. The burners or combustion elements are so disposed with relation to the radiators, and each other, as to effect a complete circulation of the products of combustion, to the end that the oven chamber may be efficiently heated, without undue multiplication of the combustion elements or burners, and yet a uniform and radiated heat provided throughout the oven chamber. The arrangement is such that the combustion gases, by which the radiators are heated, cannot enter the oven, so that such gases never become a part of or contaminate the oven atmosphere. Provision is made also for safeguarding the oven from explosions of accumulated combustible material in the radiators, which, if there is failure of ignition when the burners are turned on, might result disastrously if accumulated combustible fluid was suddenly ignited. Furthermore, a system of telltales and controls is provided, by means of which delayed or faulty ignition may be observed.

Other details of structure will be developed in the description.

In the drawings accompanying and forming a part of this application,

Figure 1 is a view in cross section of so much of a baking oven as will serve to illustrate the invention.

Figure 2 is a side view of a section of an oven, showing the radiators in end view, portions of the oven casing or wall being broken away so that it will illustrate the parts.

Figure 3 is a view in plan, on a much reduced scale, to illustrate, diagrammatically, the heating element or radiator.

Figure 4 is a plan view of a portion of the heat distributing element or radiator, showing the safety valve.

Figure 5 is a vertical sectional view taken on substantially the line 5—5 of Figure 4.

Figure 6 is an end view of a burner tip.

Figure 7 is a sectional view of the burner tip.

Figure 8 is a diagrammatic showing of the telltale circuit for the igniter.

Referring to the drawings by numbers, like numbers indicating like parts in the several views, 10 indicates, generally, an oven structure, which may be of any approved design and material, the construction here shown being rectangular in cross section, and having suitable insulated heat retaining walls. It is the insulated oven of the Crawford Patent No. 1,649,575, and is used simply as an illustration.

Within this oven any suitable supports may be provided, dependent upon the use to which the oven is to be put, there being shown, in this particular illustration, a series of supports 11, forming trackways over which a travelling conveyor 12 may pass, on which the material under treatment may be placed.

As stated at the outset, the illustrative showing here is a baking oven, and the conveyor elements 12 are designed to travel through the oven carrying the material to be baked through the heated areas. I do not, however, limit my invention to the illustrative embodiment here shown.

At proper points in the oven chamber are disposed the heat distributing elements or radiators 13, which are closed, except at their ends 14, and are preferably formed of thin sheet metal, such as pipe or well casing, so as to give a quickly heated and rapidly radiating heat distributing element. The radiators 13 are so formed as to give a complete circulating system, so that products of combustion introduced into them, circulate through the radiators; heating them, and will then be vented from the system, so that they will give off and distribute, through the chamber of the oven, an indirect or radiated heat.

The radiators 13 will be distributed in the oven chamber in such numbers and in such relation to one another as to insure even heating of the chamber, and preferably I dispose them, as shown, transversely, and they may, as here shown, be disposed in sets above and below the support or conveyor on which the material to be treated is placed.

While the radiators may take different forms, I have found that the rectangular form, diagrammatically shown in Figure 3, is a satisfactory one, although as to the matter of design, that may be changed.

The radiators 13 may be supported in any suitable manner within the chamber of the oven, but I have found that a convenient way to support them is to mount the ends 14 of each radiator section in openings in the side walls of the furnace 10, suitable glands or stuffing boxes 15 being provided, by means of which the ends 14 may be held in place, and the radiator 13 fixed in position, the glands 15 effectually sealing the ends 14 of the radiators so that there can be no escape and waste of heat from the oven chamber through the wall, and danger of oven moisture wetting or saturating the insulation is completely eliminated. While these radiator ends 14 may project any suitable distance through or beyond the oven, I have found it desirable to provide the oven walls 10 at the point where the radiator ends 14 project, with recess 16 into which the ends 14 of the radiators project and are coupled with the safety valve heads 17, as best shown in Figure 5 of the drawings. Beyond the oven walls 10 may be placed any suitable finishing wall, as 18, so that there will be a heat insulating space between the outside of the oven wall and the finishing casing.

The safety valve casing 17 is provided with a port 19, preferably opening upwardly as shown, and this port 19 is closed by a valve 20 fitted to the seat of the port 19, as shown in Figure 5. The valve 20 is preferably held in place by its own weight, although it might, of course, be a spring-closed valve, if, for any reason, the conditions should require that the valve be urged to its seat by some force other than gravity, and is of sufficient weight to resist any ordinary pressures of combustion in the radiator 13. If, however, there should be an extraordinary pressure in the radiator, due to the explosion of an accumulation of combustible material, the valve 20 will lift, immediately relieving the pressure in the radiator, and, upon cessation of abnormal pressure, will again drop to its seat and close the port 19. In order to guide the valve 20, in its movements, I provide any suitable means, such as the guide pins 21, and to steady the valve 20 in its movements on the pins 21, I find it desirable to provide the sleeves 22, on the valves 20, which prevent any jamming of the valve due to uneven lifting or tilting, and ensure the regular rising and falling of the valve.

The outer wall 18, of the enclosing casing for the oven, is preferably provided with an opening 23 which gives access to the valve-head and its associated parts, a suitable cover plate 24 being provided which can be removed when the parts, located in the space between the finishing wall 18 and the oven wall 10, need attention.

The valve head 17 will be provided with a peep-hole pipe 25, preferably as shown in Figure 5, secured to the end wall of the head 17, and, by preference, also inclined as shown, this pipe 25 being provided with a cap 26 having any suitable form of closure 27, by which it may be tightly closed. By means of this peep-hole pipe 25, the burner for the combustible mixture, and the igniting device, may be observed at any point in the battery of radiators where they are used, and a close check kept on their operation.

Mounted in any suitable manner, and preferably in the end wall of the head 17, is a burner 28 for the combustible mixture, the burner 28 being carried by a pipe 29, to which, by means of a passage 30, the combustible mixture, coming from any suitable supply, is delivered by the pipe 31. In the arrangement shown in Figure 2, the main fuel supply pipe 32, provided with a control valve 32', has branch connections to the burner feed pipes 31, which pipes 31, in turn, are coupled to the end wall of the head 17, and, by the passage 30, in the end wall deliver to the pipe 29 and burner 28. The pipes 31 may be provided with suitable valves, as 31', by means of which the different burners may be cut in or cut out of the line, or the amount of fuel passing to the burners regulated.

The burners 28 are disposed at opposite ends of the radiators 13, and project into the open ends 14 of the radiator. The fuel, fed under pressure, and burning at the burner 28 with a blast effect, will set up circulation in opposite directions in the long limbs of the radiator 13, and this circulation will continue through the short limbs of the radiator so as to give a complete circulation in the same direction, of the products of combustion, through the radiator, and, by radiation and indirect heating, bring the temperature of the oven chamber to the proper degree.

It will be observed that the products of combustion never enter the oven chamber, and this, in the baking of food stuffs, is highly desirable, as the fuel fumes are never in contact with the food stuffs. I have found, however, that by this indirect heating and radiating method, a very high, uniform temperature may be quickly produced in the oven chamber, and the delivery of the flame directly to the oven chamber may be done away with.

The burner 28 will be preferably of the type shown in Figures 6 and 7, comprising a hollow head which is secured to the pipe 29 and divided, near its tip, by the perforated partition 33, so that the fuel issues in the form of small jets, and burns at the tip with an intense blast flame.

In order to properly ignite the burners 28, I preferably provide for an igniting flame at one side of the tip. As shown in Figure 7, there is provided a passage 34, through the wall of the burner 28, which delivers to perforations 35, leading to a small recess 36, offset from the chamber 37, at the burner tip. In igniting relation to the recess 36, as shown in Figures 6 and 7, I provide igniting means, such as the electric coil 38, which will be heated to a firing incandescence by means of an electric current, and ignite the fuel issuing from the small offset recess 36, which, in turn, will fire the main body of fuel coming through the perforated wall 33 into the tip 37.

I have found, that with this arrangement, the life of the igniter, if an electric igniter, such as is here shown, is used, is materially prolonged, since it is not subjected to the direct heat of the main blast. In fact, tests have shown, that the temperature of the coil 38 is materially lessened, after ignition has taken place, and the main burner is operating, due, according to my theory, to the cooling effect of the circulation which is set up in the radiator immediately the blast burners start. Furthermore, I find, that by igniting a small igniting flame in the recess 36, and from it lighting in turn the main flame, a much surer action results, than if the igniting coil is placed in position to light the main body of fuel as it issues from the burner, due, in my opinion, to the fact that the velocity of the fuel coming from the recess 36 is less than that coming from the main burner, and it is more readily touched off by the coil 38.

The coil 38 will be supplied with current from any suitable source through the connections 39, which connections, as here shown, pass through passages in the projection 40 on the burner head 28.

It has been pointed out, that the burner and its connections may be inspected through the peep-hole pipe 25, in order to give a better control, and to indicate to the operator the conditions of the burner and its igniting elements. Preferably, I provide a telltale device, located so that it may be seen at the outer wall of the furnace. This device comprises a coil 41, which is coupled in series with igniting coil 38, and which, when current is turned on, will be brought to incandescence. By the use of this indicating device it can be determined quickly, whether or not there is any failure or disturbance of ignition in any burner, for, if the ignition coil 38 should fail to glow, by reason of broken circuit or any other condition which would effect it, the coil 41, which is in series in the circuit, will also fail to glow, and the burner which is operating unsatisfactorily is at once spotted, and may be checked up and the igniter put into proper condition.

It will be understood that this system is a true circulating system of indirect heating or radiation and is not a plenum system. In order to relieve the radiators 13 and provide for the escape of products of combustion in the circulatory system I preferably provide lead-off pipes 42, connected with the head 17 of each radiator and delivering to a pipe 43 which, in turn, delivers to any suitable outlet, as the stack 44.

It will be understood, and as shown in Figures 1 and 2, where a section of a baking oven is shown, that the radiators 13, with their cooperating adjuncts, will be distributed at intervals throughout the oven chamber, which may be of any desired length, and the arrangement is such that any number of radiators may be put in operation or cut out, as may seem best. For example, as shown in Figures 1 and 2, both or either the upper or lower set of radiators 13 can be in operation. By the arrangement of radiators shown, the oven chamber can be regulated as to temperatures very readily, and if desired, the temperatures can be varied in different sections of the oven by varying the heating of the radiators.

It will be understood that such variations from the structure illustrated and described as are within the range of mechanical skill may be made and still be within the range of my invention.

I claim:

1. The combination with an oven; of a closed oven-contained radiator having a continuous circulatory passage therethrough; a projecting radiator section at each end of said radiator opening outside the furnace wall; and a blast nozzle in each of said radiator ends to introduce a heating medium at a plurality of points to the circulatory passage of said radiator and heat the oven by radiation.

2. The combination with an oven; of a closed oven-contained radiator having a continuous circulatory passage therethrough, radiator ends projecting from said radiator at opposite and laterally offset points and opening outside the furnace walls; and blast nozzles to deliver to each of said radiator ends a heating medium to the circulatory passage of said radiator to heat the oven by radiation.

3. The combination with an oven; of a substantially rectangular radiator having a continuous circulatory passage therethrough and having two of its limbs projecting through the furnace walls; and blast nozzles to introduce a heating medium at said projecting radiator ends to heat the oven by radiation.

4. The combination with an oven; of a substantially rectangular radiator having a continuous circulatory passage therethrough and having a limb projecting at opposite ends of the radiator through the furnace walls; and a blast nozzle to introduce the heating medium at each of said projecting ends to heat the oven by radiation.

5. The combination with an oven; of a closed, oven-contained radiator having a continuous circulatory passage therethrough and provided with a passage opening outside the oven chamber; means for delivering a heating medium through the outside passage to the continuous circulatory passage; and means in the outside passage to relieve abnormal pressure in the radiator.

6. The combination with an oven; of a closed, oven-contained radiator having a continuous circulatory passage therethrough and provided with a passage opening outside the oven chamber; and means in the outside passage automatically to relieve abnormal pressure in said radiator.

7. The combination with an oven; of a closed, oven-contained radiator having a continuous circulatory passage therethrough and provided with a passage opening outside the oven chamber; means for introducing through the outside passage a heating medium under pressure to said radiator; and a valve in said outside passage to relieve pressure in said radiator.

8. The combination with an oven; of a closed, oven-contained radiator having a continuous circulatory passage therethrough and provided with a passage opening outside the oven chamber; means for introducing through the outside passage a heating medium under pressure to said radiator; and an automatic valve in said outside passage to relieve pressure in said radiator.

9. The combination with an oven; of a closed, oven-contained radiator having a continuous circulatory passage therethrough and provided with a passage opening outside the oven chamber; means for introducing through the outside passage a heating medium under pressure to said radiator; and a pressure operated valve automatically to relieve pressure in said radiator.

10. The combination with an oven; of a closed, oven-contained radiator having a continuous circulatory passage therethrough and provided with a passage opening outside the oven chamber; means for introducing through the outside passage a heating medium under pressure to said radiator; and a valve operated automatically by abnormal pressure in said radiator to relieve said radiator.

11. The combination with an oven; of a closed, oven-contained radiator having a continuous circulatory passage therethrough and provided with a passage opening outside the oven chamber; means for introducing through the outside passage a heating medium under pressure to said radiator; and a weighted valve operated automatically by abnormal pressure in said radiator to relieve said radiator.

12. The combination with an oven; of a closed, oven-contained radiator having a continuous circulatory passage therethrough; an end projecting from said radiator and opening outside the wall of the oven chamber; a safety head on the projecting radiator end having a relief port; and a gravity-closed valve opening under abnormal pressure in said radiator normally closing the relief port.

13. The combination with an oven; of a closed, oven-contained radiator having a continuous circulatory passage therethrough; a radiator end projecting from said radiator and opening outside the wall of the oven chamber; a safety head on the projecting radiator end having a relief port; a gravity-closed valve opening under abnormal pressure in said radiator normally closing said port; and means for guiding said valve to maintain it always in proper relation to the port.

14. The combination with an oven; of a closed, oven-contained radiator having a continuous circulatory passage therethrough; a radiator end projecting from said radiator and opening outside the wall of the oven chamber; a safety head on the projecting radiator having a relief port; a gravity-closed valve opening under abnormal pressure in said radiator normally closing said port, and guide pins for guiding said valve to maintain it always in proper relation to the port.

15. The combination with an oven; of a closed, oven-contained radiator having a continuous circulatory passage therethrough; a radiator end projecting from said radiator and opening outside the wall of the oven chamber; a safety head on the projecting radiator having a relief port; a gravity-closed valve opening under abnormal pressure in said radiator normally closing said port, guide pins on said head for guiding said valve; and pin-engaging sleeves on said valve cooperating with said pins to maintain said valve always in proper relation to the relief port.

16. The combination with an oven; of a closed, oven-contained radiator having a continuous circulatory passage therethrough, a radiator end projecting from said radiator and opening outside the oven chamber; a head connected with said radiator end; a fuel nozzle to receive fuel under pressure mounted on said head and delivering to said radiator; and means for igniting the fuel as it issues from the nozzle.

17. The combination with an oven; of a closed, oven-contained radiator having a continuous circulatory passage therethrough; a radiator end projecting from said radiator and opening outside the oven chamber; a head connected with said radiator end; a pressure-operated relief valve carried by said head; a fuel nozzle carried by said head and delivering to the radiator passage, and means for igniting the fuel.

18. The combination with an oven; of a closed, oven-contained radiator having a continuous circulatory passage therethrough; a radiator end projecting from said radiator and opening outside the oven chamber; a head connected with said radiator end; a pressure-operated relief valve carried by said head; a fuel nozzle carried by said head and delivering to the radiator passage; and means for igniting the fuel; said head being provided with a peep-hole to permit inspection of the burner and igniting means.

19. The combination with an oven; of a closed oven-contained radiator having a continuous circulatory passage therethrough; a radiator end projecting from said radiator and opening outside the oven chamber; a head connected with said radiator end; a pressure-operated relief valve carried by said head; a fuel nozzle carried by said head and delivering to the radiator passage; means for igniting the fuel; and a peep-hole pipe carried by said head to permit inspection of said burner and igniting means.

20. The combination with an oven; of a closed, oven-contained radiator having a continuous circulatory passage therethrough; a radiator end projecting from said radiator and opening outside the oven chamber; a pressure-operated relief valve carried by said head; a fuel nozzle carried by said head and delivering to the radiator passage; means for igniting the fuel; a peep-hole pipe carried by said head to permit inspection of said burner and igniting means; and means for closing said peep-hole pipe.

21. The combination with a heating radiator having a circulatory passage for the heating medium; of a fuel nozzle delivering to said radiator passage; an igniting device for said fuel nozzle; and a distant telltale to indicate the condition of said igniting means.

22. The combination with a heating radiator having a circulatory passage for the heating medium; of a fuel nozzle delivering to said radiator passage; an electric igniting device for said fuel nozzle, and a distant telltale to indicate the condition of said electric igniting means.

23. The combination with a heating radiator having a circulatory passage for the heating medium; of a fuel nozzle delivering to said radiator passage; an electric igniting device for said fuel nozzle, and a distant electric telltale to indicate the condition of said igniting means.

24. The combination with a heating radiator having a circulatory passage for the heating medium; of a fuel nozzle delivering to said radiator passage; an electric igniting device for said fuel nozzle; and a distant electric telltale in series with said igniting means to indicate the condition of said igniting means.

25. The combination with a heating radiator having a circulatory passage for the heating medium; of a fuel nozzle delivering to said radiator passage; an igniting electric coil at said nozzle to be heated to firing incandescence by electric current; and an electric telltale comprising a coil to be heated to incandescence by electric current in series with said igniting coil to indicate the conditions of said igniting coil.

26. A radiator head open at one end and having an end wall closing its opposite end; a pipe to deliver a heating medium to a radiator carried by said end wall and extending toward the open end of said head; and a normally closed safety valve, responsive to abnormal pressures in a radiator, in a wall of said head.

27. A radiator head open at one end and having a wall at the opposite end of said head provided with a passage; a pipe for delivering a heating medium to a radiator secured to said end wall and in communication with the passage; and a normally closed safety valve in a side wall of said head, responsive to abnormal pressure within a radiator.

28. A radiator head having an open end, and a relief port, and a wall opposite said open end provided with a passage; a pipe to deliver a heating medium disposed centrally of said wall and in communication with the passage extending from said head; and a safety valve, responsive to abnormal pressure in a radiator, closing the relief port in said head.

29. A radiator head having an open end adapted to communicate with a radiator; and a relief port in its wall; an end wall opposite said open end provided with a fuel passage; a burner pipe removably mounted in said end wall in communication with said passage and extending longitudinally of said head; igniting means carried by said burner pipe; and a pressure-operated relief valve closing the relief port in said head and responsive to abnormal pressure within said head.

30. A radiator head having an open end adapted to communicate with a radiator, and a relief port in its wall; an end wall opposite said open end provided with a fuel passage; a burner pipe removably mounted in the end wall in communication with said passage and extending longitudinally of said head; igniting means carried by said burner pipe; a pressure-operated relief valve closing the relief port in said head and responsive to abnormal pressure within said head; and a peep-hole pipe carried by said end wall.

31. A radiator formed of interconnecting pipes disposed in such relation as to form a substantial rectangle and provide a single closed continuous circulatory passage, a plurality of said pipes having ends projecting outside the boundary of the circulatory passage.

32. A radiator formed of interconnecting pipes disposed in such relation as to form a substantial rectangle and provide a single closed continuous circulatory passage, a plurality of said pipes having ends at opposite points in the radiator projecting outside the boundary of the circulatory passage.

33. A radiator formed of interconnecting pipes disposed in such relation as to form a substantial rectangle and provide a single closed continuous circulatory passage, a plurality of said pipes having ends at opposite and laterally offset points in the radiator projecting outside the boundary of the passage.

34. A radiator formed of interconnecting pipes disposed in such relation as to form a substantial rectangle and provide a single continuous circulatory passage, one at least of said pipes having an end projecting outside of the boundary of the circulatory passage; and a head secured to said projecting end and provided with a normally closed relief valve.

35. A radiator formed of interconnecting pipes disposed in such relation as to form a substantial rectangle and provide a single closed continuous circulatory passage, one at least of said pipes having an end projecting outside of the boundary of the circulatory passage; and a head secured to said projecting end and provided with an automatically opening pressure-actuated relief valve normally closed under pressure.

36. A radiator formed of interconnecting pipes disposed in such relation as to form a substantial rectangle and provide a single closed continuous circulatory passage, one at least of said pipes having an end projecting outside of the boundary of the circulatory passage; and a head secured to said projecting end and provided with a normally closed relief valve opening automatically under abnormal pressure within the radiator.

37. A radiator formed of interconnecting pipes disposed in such relation as to form a substantial rectangle and provide a single closed continuous circulatory passage, one at least of said pipes having an end projecting outside of the boundary of the circulatory passage, and a head on said projecting end having means for introducing a heating medium under pressure; and a normally closed relief valve to open automatically under abnormal pressure in the radiator.

38. A radiator formed of interconnecting pipes to provide a continuous circulatory passage, one at least of said pipes having an end projecting outside the boundary of the circulatory passage; and a head on said projecting end having a blast fuel nozzle, igniting means for said fuel nozzle; and a relief valve opening under abnormal pressure in the radiator.

39. A radiator formed of two substantially L-shaped pipe sections interconnected so as to form a closed continuous circulatory passage, said pipe sections having ends projecting beyond the boundary of the circulatory passage.

40. The combination with an oven, of a closed oven-contained radiator having a circulatory passage through which during operation of the oven there will be a continuous flow of heating medium; means to introduce a heating medium to the circulatory passage of said radiator and heat the oven by radiation; an exhaust vent, a connection between the circulatory passage of said radiator and said exhaust vent, and a relief valve for said radiator to relieve abnormal pressure in said radiator.

41. The method of heating ovens by radiation which consists in placing within an oven chamber a radiator having a continuous recirculating passage closed from the oven chamber, delivering at a plurality of points to and circulating in continuous flow through said radiator during operation a heating medium, and diffusing heat by radiation through the oven chamber.

42. The method of heating ovens by radiation which consists in placing within an oven chamber a radiator having a continuous recirculating passage closed from the oven chamber, delivering at a plurality of opposed points to and circulating in continuous flow through said radiator during operation a heating medium, and diffusing heat by radiation through the oven chamber.

43. The method of heating ovens by radiation which consists in placing within an oven chamber a radiator having a continuous recirculating passage closed from the oven chamber, delivering at a plurality of opposed and laterally offset points to and circulating in continuous flow through said radiator during operation a heating medium, and diffusing heat by radiation through the oven chamber.

44. The method of heating ovens by radiation which consists in placing within an oven chamber a radiator having a continuous recirculating passage closed from the oven chamber, delivering at different points to said radiator a fuel under pressure, igniting the fuel to produce a blast flame at different points, circulating in continuous flow through said radiator during operation the heating medium from the blast burner, and diffusing it by radiation through the oven chamber.

45. The method of heating ovens by radiation which consists in placing within an oven chamber a radiator having a continuous recirculating passage closed from the oven chamber, delivering at opposite ends and at laterally offset points to said radiator a fuel under pressure, igniting the fuel to produce a blast flame at opposite ends and at laterally offset points, circulating in continuous flow through said radiator during operation of the heating medium from the blast burner, and diffusing it by radiation through the oven chamber.

46. The combination with an oven; of a radiator having a continuous recirculating passage therethrough closed from the oven chamber, and means to introduce at a plurality of points a blast flame to the passage of said radiator and heat the oven by radiation.

47. The combination with an oven; of a radiator having a continuous recirculating passage therethrough closed from the oven chamber, and means to introduce at a plurality of opposed points a blast flame to the passage of said radiator and heat the oven by radiation.

48. The combination with an oven; of a radiator having a continuous recirculating passage therethrough closed from the oven chamber, and means to introduce at a plurality of opposed and laterally offset points a blast flame to the passage of said radiator and heat the oven by radiation.

49. The combination with an oven; of a closed, oven-contained radiator having a continuous circulatory passage therethrough; a head connected with said radiator; a pressure-operated relief valve carried by said head; a fuel nozzle carried by said head and delivering to the radiator passage; and means for igniting the fuel; said head being provided with a peep-hole to permit inspection of the burner and igniting means.

50. The combination with an oven; of a closed oven-contained radiator having a continuous circulatory passage therethrough; a pressure-operated relief valve carried by said head; a fuel nozzle carried by said head and delivering to the radiator passage; means for igniting the fuel; a peep-hole pipe carried by said head to permit inspection of said burner and igniting means; and means for closing said peep-hole pipe.

51. The combination of a radiator head adapted to be attached to a radiator section, said head having an open end delivering to the radiator section and a relief port in its wall, a pipe projecting from a wall of said head to deliver a heating medium under pressure to the radiator section, and a loosely mounted safety valve responsive to abnormal pressure within the head and radiator normally closing the relief port in the wall of said head.

In testimony whereof I have hereunto set my hand.

WILLIAM WALLACE KEMP.